United States Patent Office 2,807,856
Patented Oct. 1, 1957

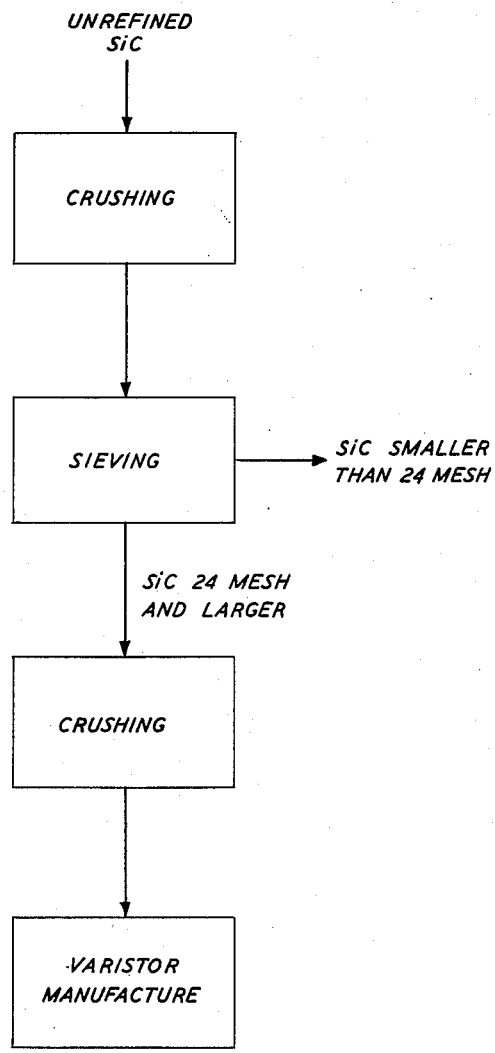

2,807,856

MANUFACTURE OF SILICON CARBIDE VARISTORS

Carl J. Frosch, Summit, N. J., assignor to Bell Telephone Laboratories, Incorporated, New York, N. Y., a corporation of New York Application July 23, 1953, Serial No. 369,879

3 Claims. (Cl. 25—156)

This invention relates to the processing of silicon carbide for use in the manufacture of electrical resistance devices and more particularly for use in the manufacture of non-ohmic resistors.

Silicon carbide varistors are ordinarily manufactured by mixing fine particles of silicon carbide with water and a ceramic binder, pressing the mixture in a mold to the desired shape, and then drying and firing the pressed body. The electrical characteristics of such varistors are expressed by the relation:

$$E^n = kI$$

where E is the voltage across the varistor, I is the current flowing through the varistor, k is a constant for a specific resistor and n is a numerical value greater than 1. It is ordinarily desirable that the value of n be as large as possible since this exponent determines the degree to which the varistor departs from ohmic characteristics. The desired value for k depends upon the application to which the varistor is to be put and can be controlled by adding varying amounts of conductive carbon, such as graphite, to the silicon carbide mix from which the varistor is prepared.

The process of the present invention is concerned with the treatment of an aggregate of unrefined silicon carbide crystals so as to produce high yields of varistors having consistently high values of the exponent referred to above.

Silicon carbide is manufactured in batches of several tons by an electrothermal reaction between quartz sand and petroleum coke arranged in the form of an elongated horizontal mass having a central core of graphite which acts as an electrical resistance element for heating the mass. After the mass has undergone reaction to form a silicon carbide ingot, the ingot is allowed to cool and is then split open. The portion of the ingot which consists of clean crystals of silicon carbide is selected and is broken into large chunks.

This material is then crushed to a particle size which is suitable for forming varistors. This particle size preferably lies between about 2 mils and about 10 mils. After suitable washing and after removal of magnetic particles introduced during crushing, the material is mixed with the binder and fired to form the varistor body.

Varistors formed from silicon carbide particles, produced as described above by crushing the entire mass of selected silicon carbide obtained from the ingot, tend to be variable in characteristics as between varistor units and also tend to show variability in characteristics as between individual fragments of the same unit.

According to the process of the present invention, particles of silicon carbide are obtained which produce varistor units having substantially higher values of the exponent referred to above and which result in a lesser variability between units, or their sections, and which consequently result in higher yields of varistors having electrical characteristics falling within fixed limits.

This result is obtained by crushing the silicon carbide chunks, as obtained from the furnace ingot, until a substantial portion, but not all, is reduced to a particle size small enough to pass a sieve having openings of about 30 mils, such as a No. 25 sieve (United States Standard Screen Scale; ASTM Designation E-11-39) which has 24 mesh per inch and openings of 28 mils. At least a portion of the material having a particle size large enough to be retained on such a sieve is recovered from the mass, is crushed to the required size and is then formed into varistors in the conventional manner.

It has been found that, when the initial silicon carbide chunks are treated in this manner, the electrically superior silicon carbide remains in the form of the larger particles and is separated from the electrically unsuitable silicon carbide which is converted into the finer particle sizes by the crushing operation. The starting material, the discarded fines, and the desired coarser material are silicon carbide. The two fractions obtained from the raw material by crushing are substantially identical in chemical composition with each other, as well as with the starting material, but can be easily distinguished by a comparison of their respective electrical properties.

The accompanying drawing represents a flow sheet showing the steps of the process of the present invention. Unrefined silicon carbide from the furnace ingot is subjected to an initial crushing operation shown as 1 in the drawing. The crushed silicon carbide is then subjected to a sieving operation 2 in which the fraction passing a No. 25 sieve (24 mesh) is separated from the remainder of the mass and discarded. The fraction retained on the sieve is then subjected to a further crushing operation 3 and the crushed material is then utilized for varistor manufacture 4.

In order to bring about an effective separation of the electrically desirable silicon carbide from the electrically inferior form, it is necessary that the initial grinding of the unrefined material, prior to separation, be carried out to a sufficient degree to insure that as large a proportion as possible of the undesired material is reduced to a small particle size. Effective separation, resulting in a substantially improved product, can be obtained if the unrefined silicon carbide obtained from the furnace ingot is crushed until at least 20 percent by weight will pass sieve having openings of about 30 mils, or more specifically a No. 25 sieve (having openings of 28 mils).

Some further improvement is obtained as the degree of crushing is increased. From the standpoint of the quality of the varistors produced, there is no upper limit to the degree of crushing to which the silicon carbide is subjected, provided some part of the product is retained on the sieve and can thus be recovered for use. However, since the fine fraction from the sieving is discarded for electrical purposes, it is desirable in the interest of economy that the degree of crushing be as low as possible consistent with the production of good varistors.

Although the discarded fraction is usable for abrasive purposes, the silicon carbide used for abrasives commands a much lower price than that of electrical grade. Therefore, although the unrefined silicon carbide may be crushed until as much as 95 percent or even 98 percent is reduced to a particle size which will pass a No. 25 sieve, it will ordinarily be much more feasible to reduce no more than 80 percent, and preferably no more than 50 percent, to this size.

After the initial crushing operation, the electrically inferior silicon carbide, which is contained in the fraction having a particle size small enough to pass a No. 25 sieve, is separated from the remainder of the mass. This is accomplished by sieving the mass on a sieve having openings at least as large as those of the No. 25 sieve. The recovery of the largest amount of the desired fraction is obtained by sieving on a No. 25 sieve. Although the recovery decreases as sieves with larger openings are used, in some instances somewhat improved varistor properties are obtained. It is ordinarily desirable, however, to use sieves having openings the size of which lies between about 50 mils (such as a No. 16 sieve having openings of .0468 inch) and about 30 mils (such as a No. 25 sieve).

The electrically superior material which is retained on the sieve is processed for varistor manufacture in the usual manner. It is first crushed and sieved, to the desired particle size, ordinarily from 2 mils to 10 mils, and preferably about 5 mils. For the manufacture of varistors, it is desirable that the particle size of the silicon carbide be as uniform as possible. Adequate uniformity is obtained by sieving the material and by selecting material which passes one screen of the United States Standard Screen Scale (ASTM Designation E-11-39) but which does not pass the next finer sieve of the same series. Thus a very satisfactory material is that which passes the No. 100 sieve, having openings of .0059 inch but does not pass the No. 120 sieve having openings of .0049 inch.

The silicon carbide is thereafter washed and treated to remove magnetic particles. It is then formed into varistors in the conventional manner as, for instance, described in United States Patent 2,601,373 issued June 24, 1952, to H. F. Dienel and G. K. Teal. According to this procedure, the silicon carbide is mixed with water and a ceramic binder, such as clay, and, if necessary, sufficient graphite or other conductive carbon to adjust the resistivity to the required value.

The amount of clay added to the mix will ordinarily lie between about 30 percent and about 70 percent, or preferably between about 40 percent and 60 percent, of the weight of the silicon carbide. Sufficient water is added to give a workable consistency to the mix. Graphite is ordinarily added in amounts up to 5 percent or 7 percent of the weight of the solids in the mix.

The mix is then pressed into the required shape, usually in the form of a thin disc. This pressing is most suitably carried out in a mold using rubber-faced punches in a metal die block. Pressures of the order of 2 to 15 tons per square inch are ordinarily employed.

The pressed disc is then dried and fired. Firing is carried out at a temperature between 1100° C. and 1300° C. in a non-oxidizing atmosphere such as nitrogen, hydrogen or mixtures thereof. After the discs are fired, an electrode is formed on each face as by spraying on a layer of metal such as tin. A wire lead is then soldered to each electrode.

The invention has been described in terms of its specific embodiments and, since modifications and equivalents may be apparent to those skilled in the art, this description is to be considered to be illustrative of, but not necessarily to constitute a limitation upon, the scope of the invention.

What is claimed is:

1. The method of forming silicon carbide varistors from unrefined silicon carbide chunks derived from furnace ingots, which method comprises crushing the silicon carbide until the particle size has been sufficiently reduced that at least 20 percent by weight, but not all, will pass a screen having openings of about 30 mils, separating the silicon carbide fraction capable of passing through said screen from the larger particled fraction, crushing at least a portion of said larger particled fraction to a smaller particle size, and forming said last crushed material into varistors, in which method the unrefined silicon carbide being crushed is such that it is substantially identical in chemical composition with the crushed product.

2. The method of forming silicon carbide varistors from unrefined silicon carbide chunks derived from furnace ingots, which method comprises crushing the silicon carbide until the particle size has been reduced to the point at which between 20 percent and 80 percent by weight will pass a screen having openings of about 30 mils, separating at least a portion of the larger particled silicon carbide fraction which is incapable of passing through said screen from the remainder of the mass, crushing said separated portion of the larger particled fraction to a particle size between 2 mils and 10 mils, and forming said last crushed material into varistors, in which method the unrefined silicon carbide being crushed is such that it is substantially identical in chemical composition with the crushed product.

3. The method of forming silicon carbide varistors from unrefined silicon carbide chunks derived from furnace ingots, which method comprises crushing the silicon carbide until the particle size has been reduced to the point at which between 20 percent and 50 percent by weight will pass a screen having openings of about 30 mils, sieving said crushed silicon carbide on a sieve having openings between about 50 mils and about 30 mils in size, crushing the fraction retained on said sieve to a particle size between 2 mils and 10 mils, pressing said last crushed material, in admixture with a ceramic binder, into thin wafers and forming metal electrodes on the opposite faces of said wafers, in which method the unrefined silicon carbide being crushed is such that it is substantially identical in chemical composition with the crushed product.

References Cited in the file of this patent

UNITED STATES PATENTS

| | | |
|---|---|---|
| 59,165 | Battell | Oct. 30, 1866 |
| 1,346,871 | Andresen | July 20, 1920 |
| 1,898,371 | Hutchins | Feb. 21, 1933 |
| 1,906,853 | Hediger | May 2, 1933 |
| 2,031,947 | Haglund | Feb. 25, 1936 |
| 2,609,318 | Swentzel | Sept. 2, 1952 |